(12) United States Patent (10) Patent No.: US 9,301,563 B2
Hardy et al. (45) Date of Patent: Apr. 5, 2016

(54) PRESSURE SENSING GLOVE

(71) Applicants: Timothy J. Hardy, Virginia Beach, VA (US); Nicholas G. Datyner, Norfolk, VA (US)

(72) Inventors: Timothy J. Hardy, Virginia Beach, VA (US); Nicholas G. Datyner, Norfolk, VA (US)

(73) Assignee: Nova Diagnostics, LLC, Virginia Beach, VA (US)

( * ) Notice: Subject to any disclaimer, the term of this patent is extended or adjusted under 35 U.S.C. 154(b) by 126 days.

(21) Appl. No.: 13/761,776

(22) Filed: Feb. 7, 2013

(65) Prior Publication Data

US 2014/0215684 A1 Aug. 7, 2014

(51) Int. Cl.
*A41D 19/00* (2006.01)
*G06F 3/01* (2006.01)
*G01L 5/22* (2006.01)

(52) U.S. Cl.
CPC ............ *A41D 19/0031* (2013.01); *G01L 5/228* (2013.01); *G06F 3/014* (2013.01)

(58) Field of Classification Search
CPC ........................ A41D 19/0031; A41D 19/0027
USPC ........................ 2/161.1, 161.2, 163; 473/205
See application file for complete search history.

(56) References Cited

U.S. PATENT DOCUMENTS

| | | | | |
|---|---|---|---|---|
| 2,311,276 | A * | 2/1943 | Wilcox | 361/230 |
| 4,488,726 | A * | 12/1984 | Murray | 473/202 |
| 5,681,993 | A * | 10/1997 | Heitman | 73/379.02 |
| 5,733,201 | A * | 3/1998 | Caldwell et al. | 473/202 |
| 5,771,492 | A * | 6/1998 | Cozza | 2/161.2 |
| 6,016,103 | A * | 1/2000 | Leavitt | 340/575 |
| 6,913,559 | B2 * | 7/2005 | Smith | 482/4 |
| D512,549 | S * | 12/2005 | Benjamin | D2/614 |
| 7,688,213 | B2 * | 3/2010 | Power | 340/575 |
| 7,780,541 | B2 * | 8/2010 | Bauer | 473/205 |
| 7,830,265 | B2 * | 11/2010 | Power | 340/575 |
| 8,033,925 | B2 * | 10/2011 | Hardage | 473/205 |
| 8,562,165 | B2 * | 10/2013 | Thompson et al. | 362/103 |
| 8,572,764 | B2 * | 11/2013 | Thellmann | 2/161.1 |
| 2002/0194668 | A1 * | 12/2002 | Kwon | 2/161.4 |
| 2003/0056278 | A1 * | 3/2003 | Kuo et al. | 2/160 |
| 2007/0289379 | A1 * | 12/2007 | You et al. | 73/379.03 |
| 2008/0189827 | A1 * | 8/2008 | Bauer | 2/161.2 |
| 2012/0144554 | A1 * | 6/2012 | Thellmann | 2/161.1 |

* cited by examiner

*Primary Examiner* — Danny Worrell
(74) *Attorney, Agent, or Firm* — Barbara E. Johnson, Esq.

(57) ABSTRACT

An pressure sensing glove in which at least five, preferably at least seven and most preferably at least nine pressure sensors are intrinsic to the glove manufacture, usually sandwiched between layers of the glove. Between five to nine pressure sensors are positioned throughout the glove, and the pressure sensors themselves may be capacitive sensors, piezoelectric sensors, air filled bladder pressure sensors in communication with hollow tubes further connected to electronic pressure sensors, or any other sensor known in the art.

8 Claims, 4 Drawing Sheets

PRESSURE SENSING GLOVE

This patent application claims priority to U.S. Provisional Patent Application No. 61/597,425 filed 10 Feb. 2012 and incorporates the provisional patent application herein by reference in its entirety.

BACKGROUND OF THE INVENTION

1. Field of the Invention

The invention pertains to particular designs for pressure monitoring gloves, which may be used in industry, for obstetric procedures, or any other training or monitoring system in which pressure exerted by the fingers should be monitored.

2. Description of Related Art

Both medically and legally, the amount of pressure a health care provider exerts on a human baby during the birthing process is a matter of concern not only for the welfare of the baby but as a matter of medical record keeping. With increasing frequency, lawsuits are filed in response to instances of documented or suspected birthing injuries to the baby that center around assertions of excessive pressure's having been exerted on the baby's anatomy, particularly the baby's head, during birth.

However, there are many situations, in medicine and elsewhere, in which pressure of the fingers or hand (whole hand grip) should be monitored and recorded, including sports training applications, industrial or assembly line quality control, and even medical procedures other than obstetrics, including but not limited to manual therapies such as chiropracty, myofascial release and other therapies that involve exertion of pressure with the hands and fingers.

A need remains, therefore, for a way to prevent excessive pressure exertion as well as to record maximum pressures exerted by the fingers or hands of medical, industrial or sports practitioners who perform manual gripping operations.

SUMMARY OF THE INVENTION

In order to meet this need, the present invention is a pressure sensing glove in which at least five, preferably at least seven and most preferably at least nine pressure sensors are intrinsic to the glove manufacture, usually sandwiched between layers of the glove. Five pressure sensors are positioned at the palm tip of each finger, with one pressure sensor per finger. Preferably, the forefinger and thumb palm areas of the glove contain two pressure sensors, one at the finger or thumb tip and one in the palm area adjacent the second middle phalanx (bone) of the forefinger and the first proximal phalanx (bone) of the thumb. Most preferably, two additional sensors are positioned on the palm side of the glove at the palm surface corresponding to the center shaft of each of the second and fourth metacarpal bones. If desired, all nine sensors may be air bladder type sensors attached to hollow tubes which terminate in one or more capacitive sensors. By placing pressure sensors in these specific places on the glove as described above—which pressure sensors provide continuous pressure monitoring during use as reported to a data cable or tube and thence to an alerting/reporting device and/or a computer—the user cannot exert pressure in excess of a given maximum without generating one or more warning alerts in advance. In the medical/obstetrics example, for instance, when gripping any part of the baby's anatomy, the physician or other health care provider will receive one or more of an audible, visual or other sensory warning signal before the preset maximum pressure is reached. The data generated by the constant pressure monitoring also becomes a critical medical record by which empirical data during delivery is directly preserved, without any subjective interpretation. The air bladder sensor pads assure accurate pressure measurement when the item or surface gripped is irregular; capacitive or piezoelectric sensors work well but air bladder sensor pads can work better on curved or nonuniform surfaces.

DETAILED DESCRIPTION OF THE INVENTION

Figures 1, 2:
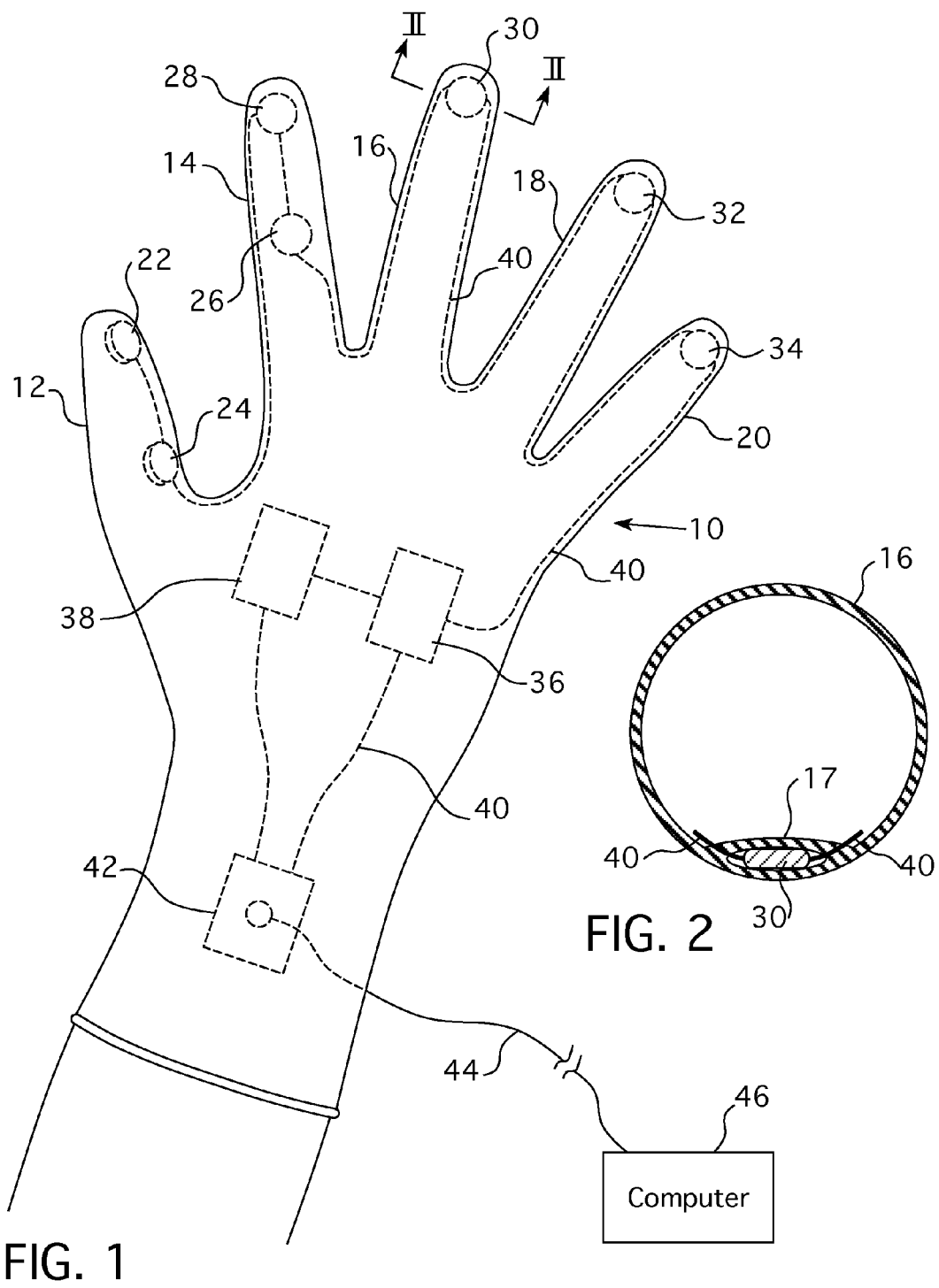
FIG. 1 is a plan view of an embodiment of the pressure sensing glove in position on a human left hand as viewed from above the palm side of the hand.
FIG. 2 is a sectional view along lines II-II of FIG. 1.

The present invention is a pressure sensing glove in which at least five, preferably at least seven and most preferably at least nine pressure sensors are intrinsic to the glove manufacture, usually sandwiched between layers of the glove. Five pressure sensors are positioned at the palm tip of each finger, with one pressure sensor per finger. Preferably, the forefinger and thumb palm areas of the glove contain two pressure sensors, one at the finger or thumb tip and one in the palm area adjacent the second middle phalanx (bone) of the forefinger and the first proximal phalanx (bone) of the thumb. Most preferably, two additional sensors are positioned on the palm side of the glove at the palm surface corresponding to the center shaft of each of the second and fourth metacarpal bones. If desired, air filled bladder sensors connected via hollow tubes to capacitive pressure sensors may be used, or capacitive, piezoelectric or other pressure sensors may be placed in the respective five, seven or nine positions as desired. Air bladder sensors attached to capacitive sensors via hollow tubes can have the advantage that they provide particularly accurate pressure sensing even on curved or irregular surfaces. By placing pressure sensors in the specific places as described and as shown in the Figures—which pressure sensors provide continuous pressure monitoring during use as conveyed to an alerting/reporting device and/or a computer—the user cannot exert pressure in excess of a given maximum without one or more warning alerts in advance. For example, in the obstetric example, when gripping any part of the baby's anatomy the physician or other health care provider will receive one or more of an audible, visual or other sensory warning signal before the preset maximum pressure is reached. The data generated by the constant pressure monitoring also becomes a critical medical record by which empirical data during delivery is directly preserved, without any subjective interpretation.

Sensors used in the glove, preferably between layers of the glove and connected with leads to an output port, may be any type of pressure sensor that will fit in the glove and operate as described herein. As one example, capacitive sensors known in the art may be fitted into the glove at on the anatomic points described above. Capacitive sensors are typically springloaded, strain-based sensors. Capacitive sensors require a dynamic excitation and virtually all or all capacitive designs contain an internal oscillator and signal demodulator to provide static capable outputs. In most cases these components will limit the useful operating temperature range from −40° C. to +120° C., so the present pressure sensing glove—when used as an obstetric glove—is intended to be worn under surgical gloves and washed or sanitized at 120° C. or lower. The sensing spring member within a capacitive pressure sensor is conductive or has conductive surfaces deposited upon it and can be, for example, positioned between two fired-alumina ceramic or glass-compound capacitor support structures. The capacitor support structures are electrically isolated, wherein the capacitor plates are screen-printed or vapor-deposited onto their respective support structures. The push-pull symmetry arrangement results in the capacitance of one side of the sensor module's increasing and the other decreasing when unbalanced pressures act upon the spring member.

Capacitive sensors can be fashioned in various ways. Some designs use flexible metal diaphragms and silicone oil-filled cavities to prevent the medium from contacting the active capacitor structures. An alternative capsule design isolates the medium from direct influence on the modulated capacitance sacrificing "push-pull" mechanical symmetry. Only one of the two capacitance structures is parameter-modulated where the other capacitor is present as a reference capacitance for the dual purposes of thermal-zero compensation and to complete the capacitance half-bridge circuit geometry. Regardless of the capacitive sensor design chosen, the capacitance change is processed with an internal oscillator and signal demodulator to provide static capable outputs, typically through a wire attached to each sensor although a small transmitter with telemetry is another way to provide data output and is within the skill of the art.

As an alternative to capacitive sensors, a piezoelectric sensor may be used in the present glove. A piezoresistive pressure sensor, or silicon cell, includes a micro-machined silicon diaphragm with piezoresistive strain gauges diffused into it, which diaphragm is fused to a silicon, glass or other substrate as a backplate. Typical piezoresistors have a value of approximately 3.5 kOhm. Pressure induced strain increases the value of the radial resistors, and decreases the value of the resistors transverse to the radius, with a resistive change that can be high as 30%. The resistors are connected as a Wheatstone Bridge, the output of which is directly proportional to the pressure, and as leadouts from the sensor gold or aluminum wires are welded to the aluminum contacts on the chip and to pins on a header attached to feed-throughs on the glass or other substrate. Again, piezoelectric sensors are known in the art and the above description explains them in the context of their incorporation into the present pressure sensing glove as described elsewhere herein. As with the capacitive sensors, as an alternative to a wire or other physical leadout it is possible to use a small transmitter with power source for telemetry transmission of data to a receiver (and recorder). In describing capacitive an piezoelectric sensors as illustrative, no inference should be drawn that other sensors known in the art now or hereafter may not be substituted without departing from the inventive scope described or claimed herein.

As an example of a specific sensor suitable for use in the present invention, at this writing a Tekscan "FlexiForce" sensor may be used with a sensing range of between 0-100 lbs force sensing. Typical health care limits on pressure on a baby's head set a maximum at 50 lb., so the preprogrammed maximum referred to elsewhere herein would be 50 lb., with at least one visual or audible or other electronic alert when pressure reaches 45 lb., for example. FlexiForce sensors are constructed of two layers of substrate. The substrate is composed of polyester film (or polyimide) and on each layer, a conductive material such as silver is applied, followed by a layer of pressure sensitive ink. Adhesive is then used to laminate the two layers of substrate together to form the sensor. A silver circle on top of the pressure-sensitive ink defines the "active sensing area" and silver extends from the sensing area to the connectors at the other end of the sensor, forming the conductive leads. FlexiForce sensors are terminated with a solderable male square pin connector, which allows them to be incorporated into a circuit. The two outer pins of the connector are active and the center pin is inactive. Conductive epoxy can be used to adhere small wires to each conductor.

The invention embraces more than the above-described capacitive and piezoelectric sensors, though, inasmuch as mechanical sensors of the air bladder type are suitable for use and on occasion even preferable to other types of sensors. Small air bladder pockets connected to hollow tubes and terminating in an array of one or more capacitive or other sensors work very well, when the air within the bladders and connecting tubes are sealed as a unit, when incorporated into the present glove as described below.

Referring now to the Figures, FIG. 1 is a plan view of the present pressure sensing glove 10 in position on a human left hand as viewed from above the palm side of the hand. The glove 10 contains first, second, third, fourth and fifth sheaths 12, 14, 16, 18, 20, which sheaths are integral fabric tubes forming part of the glove 10 which cover the thumb, forefinger, middle finger, ring finger and pinky, respectively, of a human hand wearing the glove 10. Sandwiched in between layers of the glove 10 construction are pressure sensors. Referring now to FIG. 2, which is a sectional view taken along lines II-II of FIG. 1, the sheath 16 has an internal separate layer 17 which together surround the pressure sensor 30 shown in FIG. 1. In FIG. 1, the pressure sensor 22 is positioned adjacent the tip of the thumb of the wearer, on the palm side of the glove. The sensor 24 is positioned on the palm side of the glove at the first proximal phalanx (bone) of the thumb. The sensor 28 is positioned on the palm side of the glove at the tip of the forefinger of the wearer. The sensor 26 is positioned on the palm side of the glove at the second middle phalanx (bone) of the forefinger of the wearer. The sensors 30, 32 and 34 are positioned on the palm side of the glove at the tips of the middle, ring and pinky fingers, respectively. Sensors 36 and 38 are positioned on the palm side of the glove in positions corresponding to the center shaft of each of the second and fourth metacarpal bones. The output port 42 is connected, usually, by computer cable 44 to a computer 46, although alternatively the sensors may provide data using one or more transmitters and power sources via telemetry to a computer or other processor having a receiver.

The sensors shown in FIG. 1 are connected to an output port 42 at the wrist by mean known in the art. Although leadout lines 40 are shown in a particular configuration, those skilled in the art know how to configure and connect pressure sensors to give pressure readings, and leadouts for either individual, collective or partially combined pressure readings are within the skill of the art. In other words, the pressure sensors can be connected via leadouts to report to the output port by means known in the art.

Figure 3:
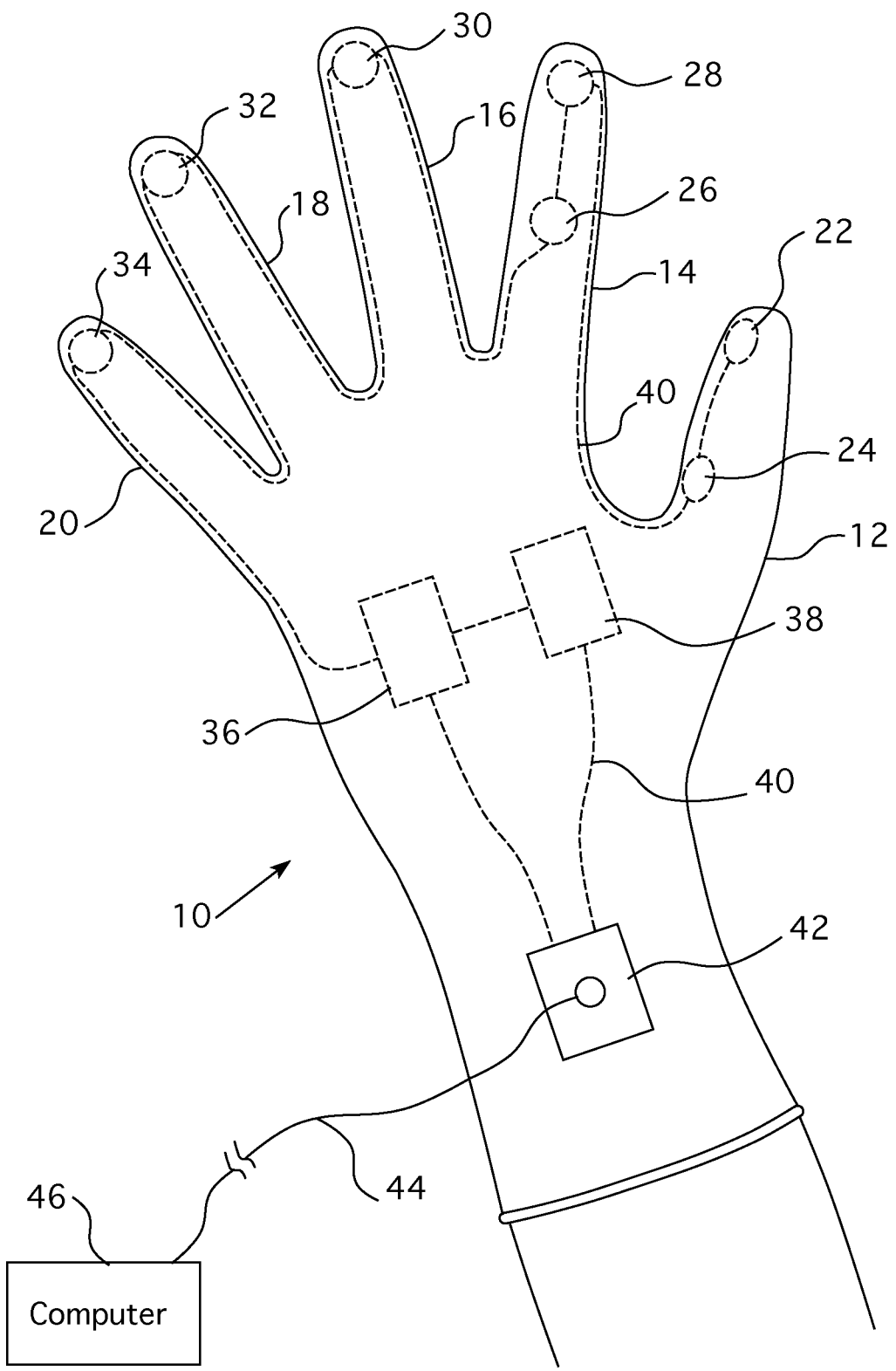
FIG. 3 is a plan view of the pressure sensing glove in position on a human left hand as viewed from above the dorsal or back side of the hand.

FIG. 3 is a dorsal view of the glove shown in palm view in FIG. 1. The components are the same as shown in FIG. 1 and the presence of the output port 42 on the outside dorsal surface of the wrist portion of the glove is readily apparent.

Figure 4:
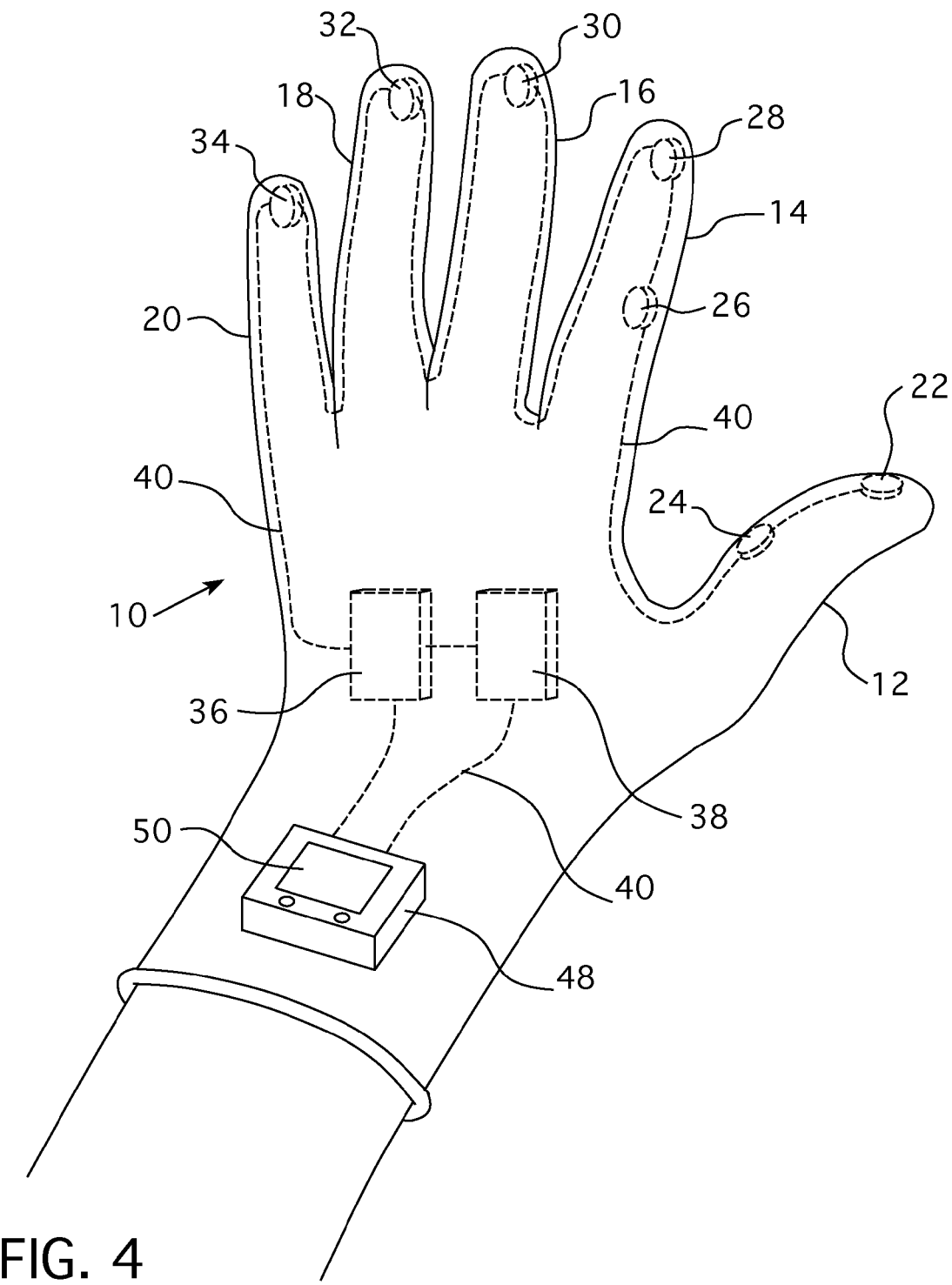
FIG. 4 is a perspective view of the inventive pressure sensing glove in position on a human left hand as viewed from above the dorsal or back side of the hand, with an alert/reporting device in position in the wrist area of the glove.

FIG. 4 is also a dorsal view of the glove shown in palm view in FIG. 1 but with one change. At the dorsal area of the glove wrist, instead of a an output port an actually miniature microprocessor 48 is present, with output screen 50. The miniature microprocessor can provide readouts showing pressure measurements in digital form, can provide audible, visual or other electronic alarms, or all of the above. When the miniature microprocessor is not present (or even when it is) other alarms including visual or audible alarms may be provided by pre-programming any associated computer to provide one or more alerts as predetermined pressure maxima are approached. Electronic records of pressures exerted by the user when wearing the glove may be recorded by means known in the art.

Figure 5:
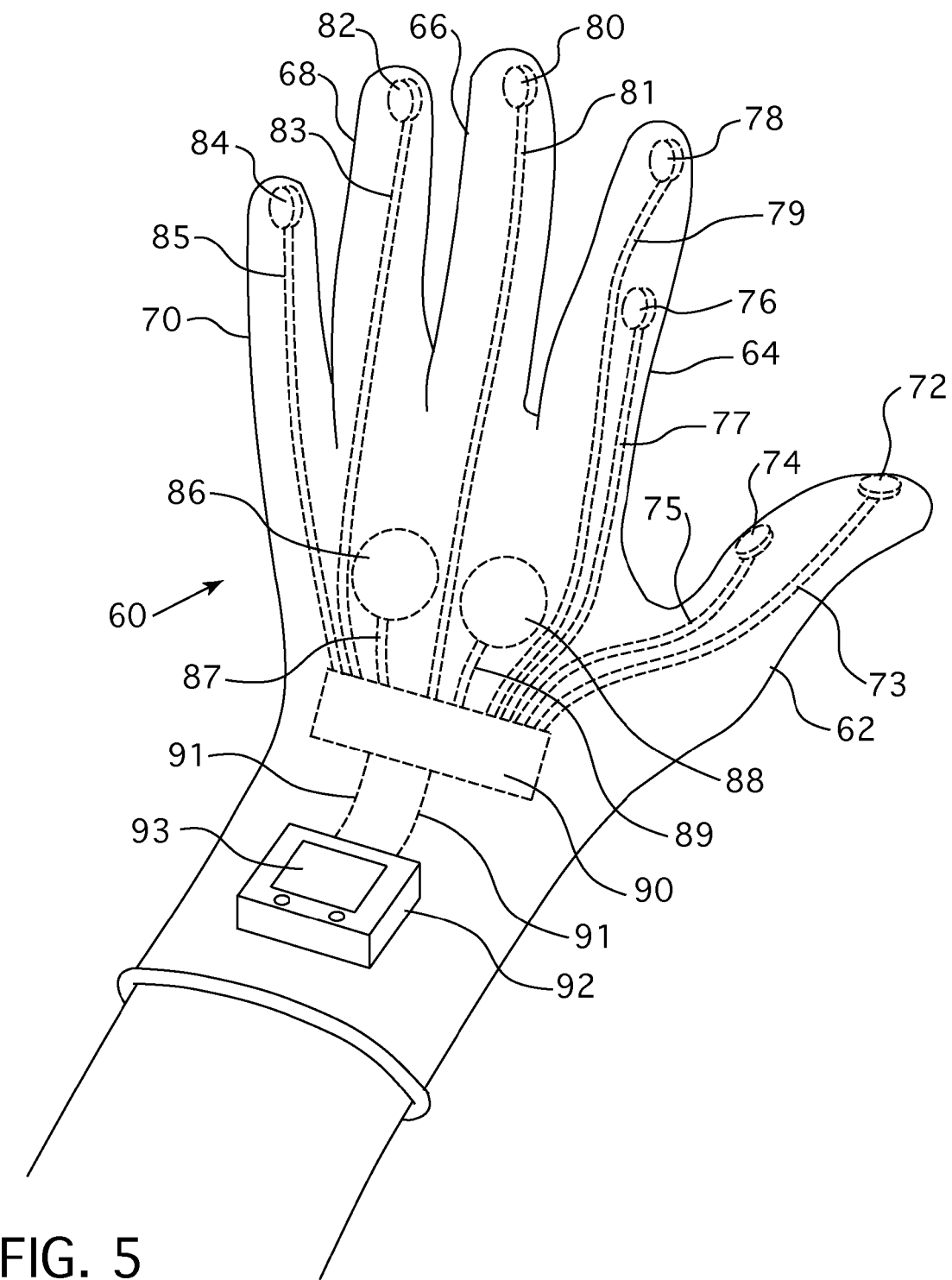
FIG. 5 is a perspective view of another embodiment of the invention, in which air filled bladders are connected by hollow tubes to a capacitive or other pressure sensor array as shown.

FIG. 5 illustrates an embodiment of the invention in which the nine sensors are actually air filled bladders integrally connected to hollow tubes which terminate in an array of one or more capacitive, piezoelectric or other electronic sensors. Glove 60 is in position on a human left hand as viewed in perspective from above the back of the hand. The glove 60 contains first, second, third, fourth and fifth sheaths 62, 64, 66, 68, and 70, which sheaths are integral fabric outcroppings which form parts of the glove 60 that cover the thumb, forefinger, middle finger, ring finger and pinky, respectively, of a human hand wearing the glove 60. Sandwiched in between layers of the glove 60 construction are air-filled bladder pressure sensors. Each air-filled bladder and its associated tube contains a contiguous volume of air, that is, the pre-loaded amount of air in the bladder may transfer without impediment into the associated tube because the bladders and tubes are continuous and create one interior, sealed space. Therefore, the air bladder pressure sensor 72 is positioned adjacent the tip of the thumb of the wearer, on the palm side of the glove, and is integrally associated with its adjacent connecting hollow tube 73. Air bladder pressure sensors 74, 76, 78, 80, 82, 84, 86 and 88 are all respectively connected to their adjacent, integrally formed hollow tubes 75, 77, 79, 81, 83, 85, 87 and 89. All of the hollow tubes 75-89 terminate in a capacitive, piezoelectric or other sensor array 90, from which the pressures exerted by the air filled bladders and tubes are translated into digital signals which in turn feed into a miniature microprocessor 92 having a screen (output to a user) 93 via electronic leads 91, all by means known in the art. As is apparent in FIG. 5, the spacing and location of the individual pressure sensors on the figures and thumb is the same as in the other Figures. The dimensions and thicknesses of the air bladder pressure sensors 74-88 and hollow tubes 75-89 may vary, but generally will involve hollow tubes having an interior diameter of between 0.01-1.5 mm, with lengths as needed to accommodate glove sizing. The air bladder pressure sensors themselves will generally range from about 1 to 14 mm in diameter, more preferably 2-9 mm, and will generally have a thickness of about 0.5-5 mm, more preferably 1-3 mm.

Key features of the present technology include the following. By providing pressure sensing at all five finger/thumb tip locations and preferably at the additional sixth through ninth disclosed sensor locations, overall pressure sensing is assured throughout the gripping surface of the health care provider's hand. The sensor data collected from the present glove is collected continuously to create a time-based continuous electronic medical record of exerted pressure. Also, there are preferably always at least two outputs to a user, namely, a screen (whether on the miniature microprocessor or an adjacent one or more stand-alone computers) providing metric pressure monitoring and at least one pre-programmed audible, visual or other electronic alarm that is triggered by approached (but not yet reaching) a pre-programmed maximum allowable pressure. Most preferably, there are two or more alerts which increase in urgency as increasing pressure approaches the preprogrammed maxima.

Manufacture of the glove may be accomplished in various ways. Generally, the gloves are not fabricated to be disposable, although they may be made to be disposable. Generally, the gloves are intended to be washed or sanitized and then further worn under other, sterile surgical gloves. The gloves may include, without limitation, latex rubber, nitrile rubber, vinyl, polyurethane or other polymers or fabrics within which the pressure sensors may be mounted.

Although the invention has been described with particularity above, with reference to specific structures and features, the invention is only to be limited insofar as is set forth in the accompanying claims.

The invention claimed is:

1. A glove consisting essentially of: a pressure sensing glove fitted with at least nine pressure sensors, wherein said glove contains five structural sheaths to cover five digits of a hand of a wearer, wherein each of said five structural sheaths corresponds to each of said five digits including a forefinger and a thumb; and wherein said nine pressure sensors are distributed so that said structural sheath corresponding to said thumb has a pressure sensor in position adjacent the tip of the thumb and a second pressure sensor in position at the first proximal phalanx of the thumb; said structural sheath corresponding to said forefinger has a pressure sensor in position adjacent the tip of the forefinger and a second pressure sensor in position at the first proximal phalanx of the forefinger; each of three remaining structural sheaths has in place a pressure sensor in position at the tip of each remaining digit; and the glove has at least two pressure sensors in the area of the glove on the palm side corresponding to a center shaft of each of the second and fourth metacarpal bones, respectively, of said wearer.

2. The glove according to claim 1 wherein each pressure sensor is structurally connected to a further pressure sensor via a tube.

3. The glove according to claim 1 wherein each pressure sensor is structurally connected to a leadout wire.

4. The glove according to claim 1 wherein each pressure sensor is configured adjacent a transmitter connected to an electricity source.

5. The glove according to claim 1 wherein said glove contains at least two layers and each pressure sensor is positioned between said at least two layers.

6. The glove according to claim 3 wherein said leadout wire is connected to a computer having an output to a user.

7. The glove according to claim 3 wherein said leadout is connected to an alert/reporting device in position in the wrist area of said glove.

8. The glove according to claim 7 wherein said alert/reporting device creates an audio, visual or electronic alarm signal during use when pressure on at least one pressure sensor approaches a pre-programmed maximum pressure.

* * * * *